(12) United States Patent
Baumann et al.

(10) Patent No.: US 8,033,508 B2
(45) Date of Patent: Oct. 11, 2011

(54) SPACE SHUTTLE WITH A DEVICE FOR DOCKING TO A SATELLITE

(75) Inventors: Andreas Baumann, Schwarzenfeld (DE); Bertram Willberg, Landsberied (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 584 days.

(21) Appl. No.: 12/223,677

(22) PCT Filed: Mar. 31, 2007

(86) PCT No.: PCT/EP2007/002910
§ 371 (c)(1),
(2), (4) Date: Aug. 6, 2008

(87) PCT Pub. No.: WO2008/119362
PCT Pub. Date: Oct. 9, 2008

(65) Prior Publication Data
US 2010/0301169 A1 Dec. 2, 2010

(51) Int. Cl.
*B64G 1/64* (2006.01)
(52) U.S. Cl. .................................................. 244/172.4
(58) Field of Classification Search ............... 244/172.4, 244/172.5, 173.3
See application file for complete search history.

(56) References Cited

U.S. PATENT DOCUMENTS

| | | | |
|---|---|---|---|
| 3,408,101 A * | 10/1968 | Savary | 376/233 |
| 3,508,723 A * | 4/1970 | Warren et al. | 244/172.4 |
| 4,177,964 A | 12/1979 | Hujsak et al. | |
| 4,291,910 A * | 9/1981 | Maupate | 294/95 |
| 5,005,786 A | 4/1991 | Okamoto et al. | |
| 5,735,488 A * | 4/1998 | Schneider | 244/172.4 |
| 6,299,107 B1 | 10/2001 | Kong et al. | |
| 6,523,784 B2 | 2/2003 | Steinsiek et al. | |

FOREIGN PATENT DOCUMENTS

| | | |
|---|---|---|
| DE | 198 48 427 | 4/2000 |
| DE | 10 2006 009 001 | 7/2007 |
| EP | 1 190 948 | 3/2002 |

OTHER PUBLICATIONS

International Search Report in English.
International Search Report in German and English translation of Written Opinion of International Searching Authority.
E. Settelmeyer et al., Dornier Satellitensysteme GmbH and K. Landzettel, DLR, 'The Experimental Servicing Satellite—ESS' (especially Fig. 7), ISTS-Conference 1998, Omiya, Japan, pp. 1-5. (Spec, p. 2).

* cited by examiner

*Primary Examiner* — Timothy D Collins
*Assistant Examiner* — Jamie S Stehle
(74) *Attorney, Agent, or Firm* — Collard & Roe, P.C.

(57) ABSTRACT

In a space shuttle with a device for docking to a satellite, especially a communication or navigation satellite, at least two spreading elements in the form of lever spreaders are pivotally disposed at a retaining part of the docking device, which is concentric to a linkage. The lever spreaders have their proximal ends—relative to the space shuttle—provided with inward projections projecting inward towards the linkage, which inward projections engage in a recess formed in the linkage when the lever spreaders, spread apart to a defined opening angle by the cone of the linkage. When the linkage is retracted further, a pressure spring is compressed. At the same time, the lever spreader caught in the recess are retracted so far that the ends of the lever spreaders, spread apart in a defined manner, positively abut the inner wall of the nozzle neck.

2 Claims, 4 Drawing Sheets

Fig.1
Fig.2
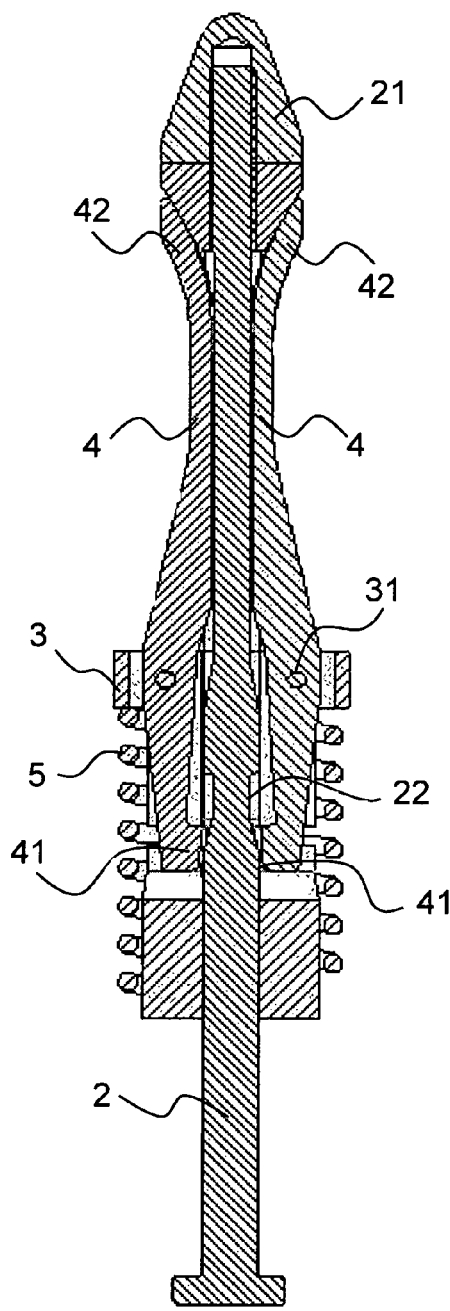
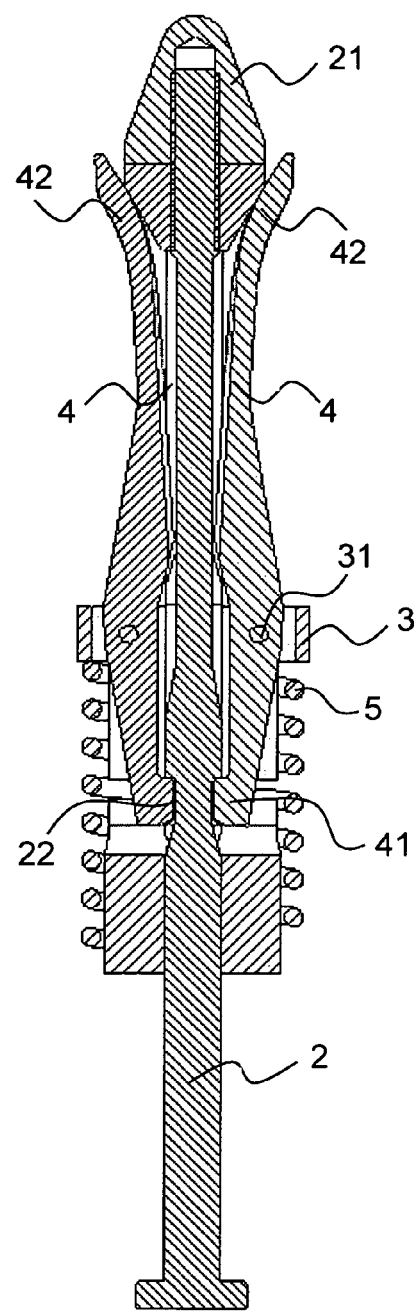

SPACE SHUTTLE WITH A DEVICE FOR DOCKING TO A SATELLITE

CROSS REFERENCE TO RELATED APPLICATIONS

This application is the National Stage of PCT/EP2007/002910 filed on Mar. 31, 2007, which claims priority under 35 U.S.C. §119 of PCT/EP2007/002910 filed on Mar. 31, 2007. The international application under PCT article 21(2) was not published in English.

TECHNICAL FIELD

The invention relates to a space shuttle comprising a docking device for docking to a satellite, in particular a communication or navigation satellite, the device comprising a displaceable linkage having a cone at its distal end—relative to the shuttle—and a spreader mechanism with spreading elements, operable from the shuttle, at least two spreading elements being pivotally provided at a retaining part of the docking device that is concentric to the linkage.

Currently, a great number of communication satellites are present in the geostationary orbit at an altitude of about 36000 km, whose fuel reserves for the position control system are generally exhausted after twelve to fifteen years of operation. Before switching such satellites off for good, they are usually transferred to a higher orbit, the so-called "cemetery orbit". In most cases, however, all other systems are still functional so that nothing would stand in the way of a continued operation of these systems.

In the meanwhile serviceable Ariane 5 carrier missile, the main payload, mostly in the form of one or two satellites, is mounted on a conic adapter establishing a connection between the top stage of the missile and the satellite or satellites. The space inside the adapter is heretofore unused. In the meantime, however, a satellite corresponding to the dimensions of the adapter has been designed that could be used as a "space shuttle", for example.

During the take-off of an Ariane 5 carrier missile, the "space shuttle" serves as an adapter on which the main payload is mounted. After the main payload has been positioned in space, the adapter is eventually detached from the top stage of the missile and will operate as a self-contained satellite serviceable as a space shuttle. Such a space shuttle could, for example, be docked to a communication satellite whose fuel supplies for controlling the position control system, for example, are largely exhausted.

BACKGROUND ART

A first embodiment of a docking device (capture tool) has been developed by the applicant Deutsches Zentrum für Luft- and Raumfahrt (DLR) as early as 1996; this docking mechanism has been used in laboratory test operation at the time.

The docking device can be introduced into the jet nozzle of an apogee engine provided in each communication satellite and may be fixed at the neck of the nozzle which is the narrowest part of the jet nozzle (see E. Settelmeyer et al., Dornier Satellitensysteme GmbH and K. Landzettel, DLR, "The experimental Servicing Satellite—ESS" (especially FIG. 7), ISTS-Conference 1998, Omiya, Japan).

This docking device comprises a linkage with a cone-shaped body, the linkage being driven by a motor via an intermediate transmission. A spreader mechanism is provided concentrically around the linkage, the mechanism comprising a number of very thin rod-shaped spreading elements made of spring steel.

When the docking device is inserted through the neck of the nozzle of the apogee engine, the spring steel spreading elements abut the cone of the linkage. By withdrawing the linkage, the spreading elements are spread to a precisely defined opening angle and are then pulled back until the spread, very thin spreading elements solidly abut the inner wall of the nozzle neck.

The spring steel spreading elements, which have a diameter in the order of 2 mm, are thus extremely thin and are coated with a layer of oxide. Since the thin spreading elements solidly abut the nozzle neck, their oxide layer is damaged to an extent, especially by unavoidable vibrations of the satellite to which the space shuttle has docked, that, after long periods of solid abutment, the thin spreading elements of spring steel become cold welded to the nozzle neck due to the high surface pressure, whereby the docking device is permanently connected to the communication satellite.

DE 198 48 427 A1 describes a space shuttle with a docking device for docking to a satellite, the docking device comprising a displaceable linkage with a cone at its distal end and a spreader mechanism with spreading elements, operable from the space shuttle. At least two spreading elements are pivotally provided on a retaining part of the docking device that is concentric to the linkage. In the area of their outward directed distal ends, the curvature of the outer surface of each of the spreading elements corresponds to the curvature of the nozzle neck of the satellite engine. From U.S. Pat. No. 6,299,107 B1 it is known that spreading elements may be designed as lever spreaders.

SUMMARY OF THE INVENTION

It is an object of the invention to design the spreading elements of a docking device such that the contact pressure between the spreader elements and the neck of the nozzle is as low as possible and a cold welding of the spreading elements and the inner surface of the neck of the nozzle can be excluded with very high probability.

For a space shuttle with a docking device for docking to a satellite, especially a communication or navigation satellite, as defined in the preamble of the main claim, this object is achieved, according to the invention, with the features of the characterizing part.

In the docking device of the present invention, the spreading elements configured as lever spreaders have inward projections at their proximal ends, relative to the space shuttle, the inward projections projecting inward toward the linkage. The central portion of the linkage is formed with a recess into which the inward projections of the lever spreaders engage when the lever spreaders are spread to a defined opening angle by the cone of the retracted linkage.

Thus, the provision of the pivotable lever spreaders not only causes a form-fit connection between the lever spreaders and the neck of the nozzle, but the contact pressure between the lever spreaders and the inner wall of the nozzle neck is reduced to such an extent, compared to the known docking device, that it can be assumed with utmost probability that a cold welding of the lever spreaders and the neck of the nozzle need not be feared.

DESCRIPTION OF THE DRAWINGS

In the Figures:

FIG. 1 is a schematic illustration of a docking device with lever spreaders resting against the same;

FIG. 2 is a schematic illustration with the lever spreaders spread to a defined opening angle;

DESCRIPTION OF THE INVENTION

Figure 3:
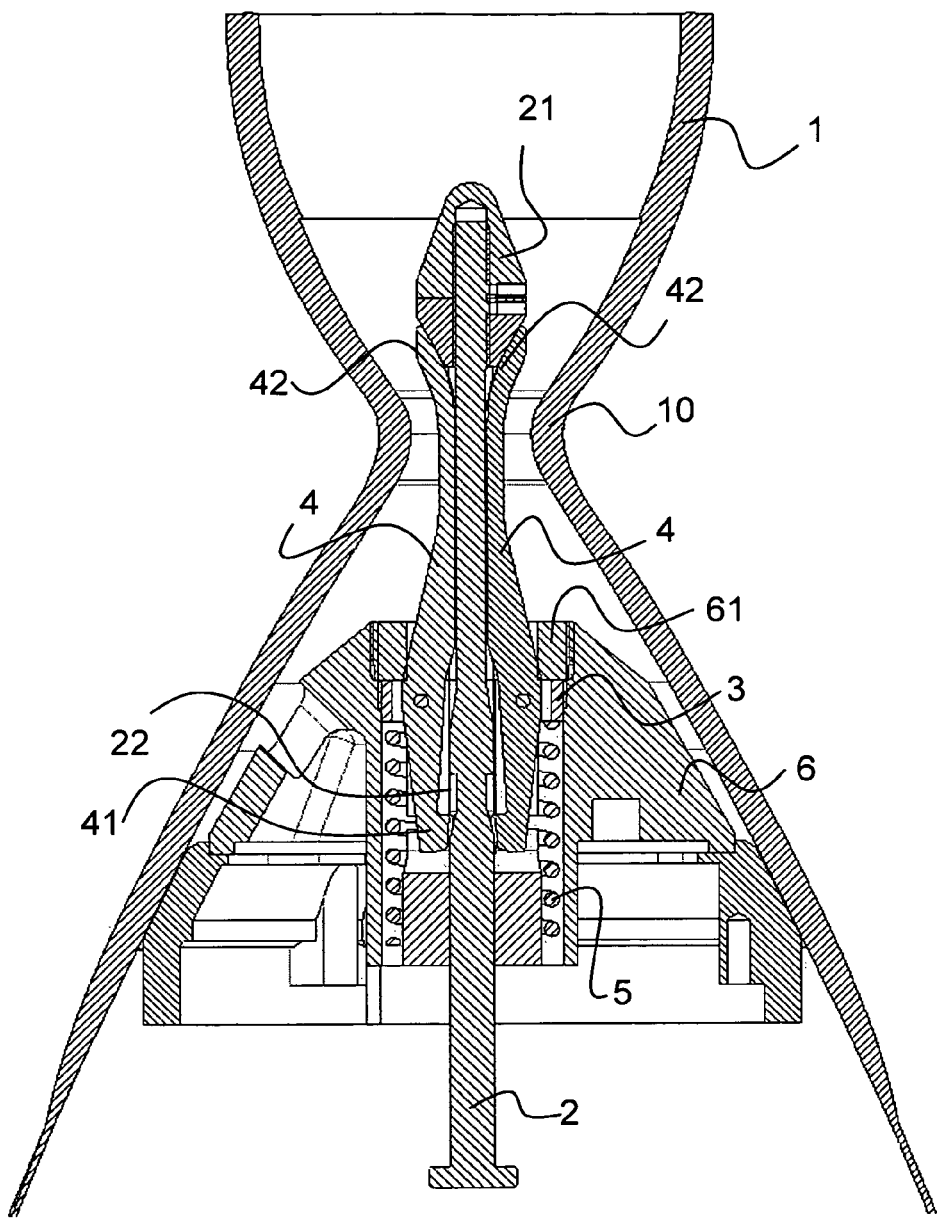
FIG. 3 is an illustration of the docking device corresponding to FIG. 1 after insertion through the neck of a nozzle.

FIG. 1 is a schematic sectional view, not drawn to scale, of the essential parts of a docking device, namely a continuous linkage 2 with a cone 21 provided at its top end in FIG. 1 and with recess 22 formed in its central lower portion; a retaining part 3 concentric to the linkage 2 below which a cylinder-shaped pressure spring 5 is arranged and into which retaining pins 31 are inserted that serve as pivot axes around which at least two, preferably four or more regularly distributed lever spreaders 4 are pivotally retained; at the lower ends of the lever spreaders 4 in FIG. 1, inward projections 41 are formed that project inward towards the linkage 2.

The outer surfaces of the lever spreaders 4 each have a curvature at the outward directed ends 42, which corresponds to the curvature of the nozzle neck 10 (FIGS. 3 to 5) of a satellite engine, usually an apogee engine. Further, the pivotable lever spreaders 4 are configured in the portion (FIG. 1) above the retaining pins 31 and before the ends 42 such that they extend approximately in parallel with the linkage 2, as illustrated in FIG. 2.

The difference between the schematic illustrations in FIG. 1 and FIG. 2 is that in FIG. 2, different from FIG. 1, the lever spreaders 4 are spread apart to a defined opening angle by withdrawing the cone 21 provided on the linkage 2. Here, the linkage 2 is retracted so far that the noses 21 formed at the lower ends of the lever spreaders 4 engage behind the recess 22 formed in the linkage 2.

In FIG. 3, the docking device described with reference to FIG. 1 is inserted so far into a nozzle 1 of an apogee engine not shown in detail that the cone 21 provided at the top end of the linkage 2, see FIG. 3, is situated above the neck 10 of the nozzle defining the narrowest point of the nozzle 1. Provided in the expansion nozzle flaring in the lower part of FIG. 3 is a kind of adapter 6 adapted to the expansion nozzle, the retaining part 3 of the docking device contacting the upper transversal part 61, see FIG. 3, of the adapter.

Figure 4:
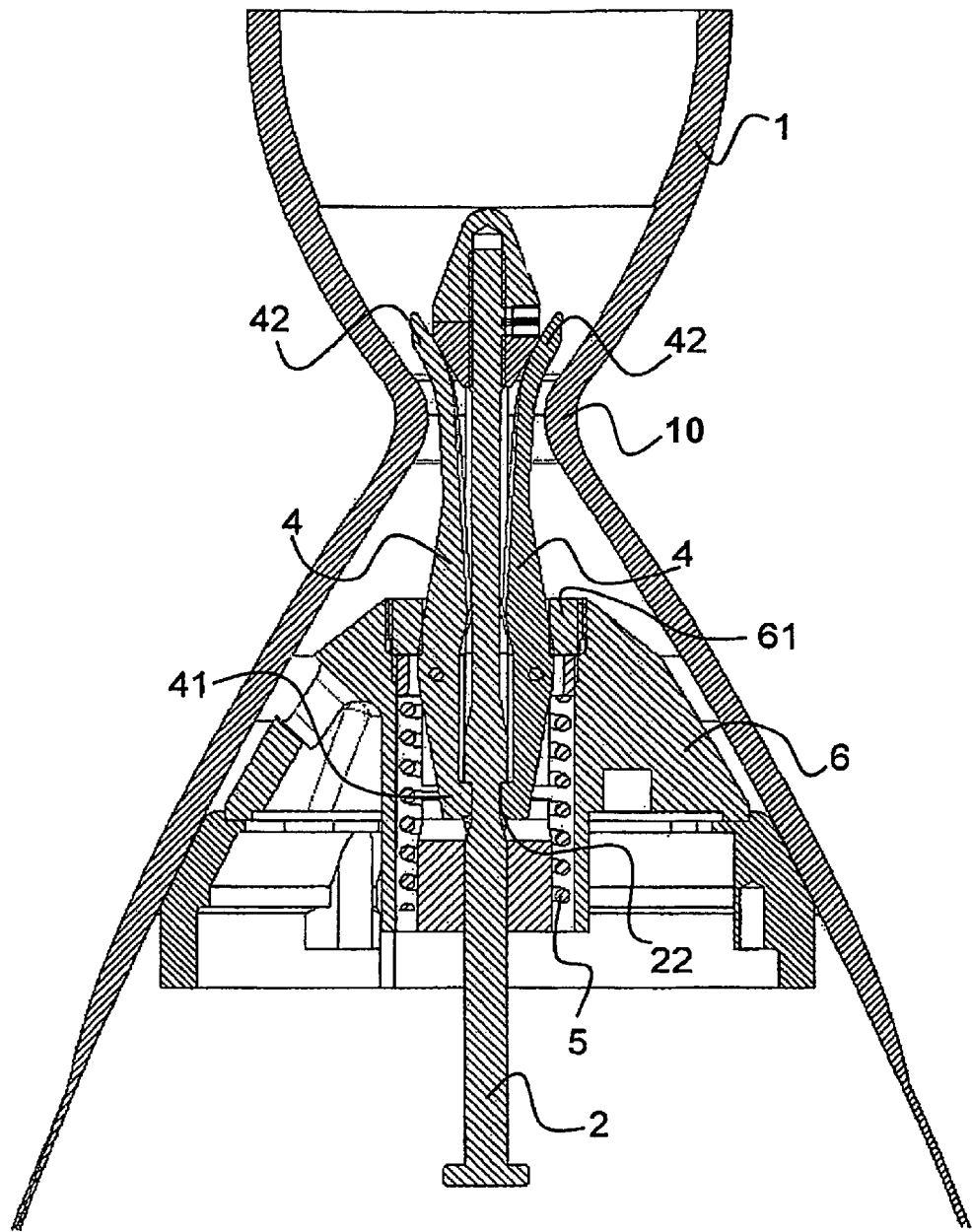
FIG. 4 is an illustration of the docking device corresponding to FIG. 2 with the lever spreaders spread to a defined opening angle.

The schematic illustrations in FIG. 3 and FIG. 4 differ in that FIG. 4 shows the linkage withdrawn so far towards the non-illustrated space shuttle that, relative to FIG. 4, the inward projections 41 formed at the lower end of the lever spreaders 4 engage the recess 22 of the linkage 2. This engaging causes the lever spreaders to be spread so far apart that the predetermined defined opening angle is obtained between them.

Figure 5:
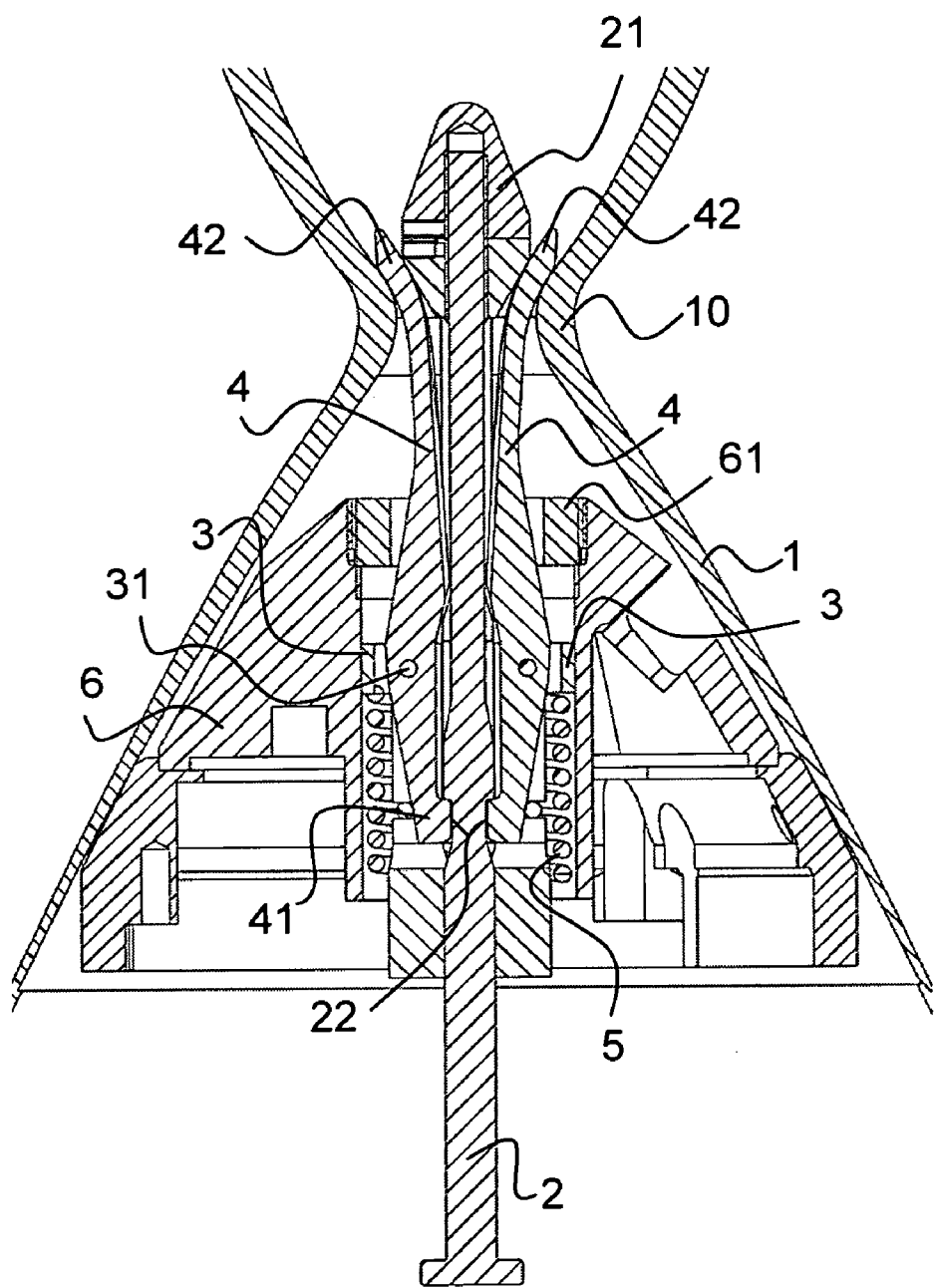
FIG. 5 is a schematic illustration with lever spreaders abutting the neck of a nozzle in a form-fit manner.

As can be seen in the schematic illustration in FIG. 5, a further withdrawal of the linkage 2, e.g. by a motor downstream of the transmission as in the initially described known embodiment, causes the pressure spring 5 to be compressed; at the same time, the lever spreaders 4 locked in the recess 22 are withdrawn far enough for the ends 42 of the lever spreaders 4, spread apart in a defined manner, to positively abut the inner wall of the nozzle neck 10. The lever spreaders 4 are spread more reliably and faster by the helical pressure spring 5 arranged below the retaining part 3.

Since, as explained above, the outer surfaces of the spreader levers 4 have their top ends 42 formed with a curvature that is adapted to the curvature of the neck 10 of the nozzle. The contact pressure between the ends 42 of the lever spreaders 4 and the neck 10 of the nozzle is much lower than in known embodiments.

Due to the above described substantially lower contact pressure between the lever spreaders 4 and the neck 10 of the nozzle, there is a high probability that a cold welding between the top end 42 of the lever spreaders 4 and the inner wall in the region of the nozzle neck 10 can be avoided.

LIST OF REFERENCE NUMERALS 1 nozzle of an apogee engine
10 narrow part of 1
2 linkage
21 cone of 2
22 recess in 2
3 retaining part
31 retaining pins
4 lever spreader
41 inward projection on 4
42 ends of 4
5 pressure spring
6 adapter
61 transverse part of 6

What is claimed is:

1. A space shuttle with a docking device for docking to a satellite, especially a communication or navigation satellite, the device comprising a displaceable linkage having a cone at its distal end—relative to the shuttle—and a spreader mechanism with spreading elements, operable from the shuttle, at least two spreading elements being pivotally provided at a retaining part of the docking device that is concentric to the linkage, wherein the spreading elements configured as lever spreaders have inward projections at their proximal ends, relative to the space shuttle, the inward projections projecting inward toward the linkage, and wherein the central portion of the linkage is formed with a recess into which the inward projections of the lever spreaders engage when the lever spreaders, spread to a defined opening angle, are withdrawn.

2. The space shuttle of claim 1, wherein the pivotable lever spreaders are configured near their pivot points and their outward bent ends such that they extend approximately in parallel with the linkage.

* * * * *